United States Patent
Kodama

(10) Patent No.: US 7,086,496 B2
(45) Date of Patent: Aug. 8, 2006

(54) ELECTRIC POWER STEERING APPARATUS

(75) Inventor: Kazumasa Kodama, Toyota (JP)

(73) Assignees: FAVESS Co., Ltd., Okazaki (JP); Toyoda Koki Kabushiki Kaisha, Kariya (JP); Koyo Seiko Co., Ltd., Osaka (JP)

( * ) Notice: Subject to any disclaimer, the term of this patent is extended or adjusted under 35 U.S.C. 154(b) by 0 days.

(21) Appl. No.: 11/098,513

(22) Filed: Apr. 5, 2005

(65) Prior Publication Data

US 2005/0230180 A1    Oct. 20, 2005

(30) Foreign Application Priority Data

Apr. 15, 2004    (JP)    ............... 2004-120407

(51) Int. Cl.
*B62D 5/04*    (2006.01)
(52) U.S. Cl. .......................... 180/446; 701/42
(58) Field of Classification Search ................ 180/443, 180/446; 701/41, 42
See application file for complete search history.

(56) References Cited

U.S. PATENT DOCUMENTS

| | | | |
|---|---|---|---|
| 6,211,681 B1 * | 4/2001 | Kagawa et al. ............. | 324/426 |
| 6,388,405 B1 * | 5/2002 | Laurent ...................... | 318/254 |
| 6,877,584 B1 * | 4/2005 | Jonokuchi et al. ........... | 180/446 |
| 2003/0111291 A1 * | 6/2003 | Jonokuchi et al. ........... | 180/446 |

FOREIGN PATENT DOCUMENTS

| | | |
|---|---|---|
| EP | 0 189 172 A2 | 7/1986 |
| WO | WO 02/054575 A2 | 7/2002 |

OTHER PUBLICATIONS

Patent Abstracts of Japan, JP 2003-011834, Jan. 15, 2003.
Patent Abstracts of Japan, JP 06-038301, Feb. 10, 1994.
Patent Abstracts of Japan, JP 06-141587, May 20, 1994.
Patent Abstracts of Japan, JP 58-172984, Oct. 11, 1983.

* cited by examiner

*Primary Examiner*—Kevin Hurley
(74) *Attorney, Agent, or Firm*—Oblon, Spivak, McClelland, Maier & Neustadt, P.C.

(57) ABSTRACT

The invention provides an electric power steering apparatus in which a dead zone is not generated even at a low duty ratio while slow starting a switching element. When a duty ratio of a PWM control becomes more than a preset value (NO in S14), a switching cycle is set to a predetermined value (a fixed value) (S20). When the duty ratio becomes equal to or less than the preset value (Yes in S14), the switching cycle is made longer than the predetermined value (S16). It is possible to securely apply a current to a motor and it is possible to prevent a dead zone from being generated, by elongating the switching cycle even in a low duty ratio while slow starting an FET and preventing a noise from being generated.

7 Claims, 12 Drawing Sheets

Fig.4
(A)
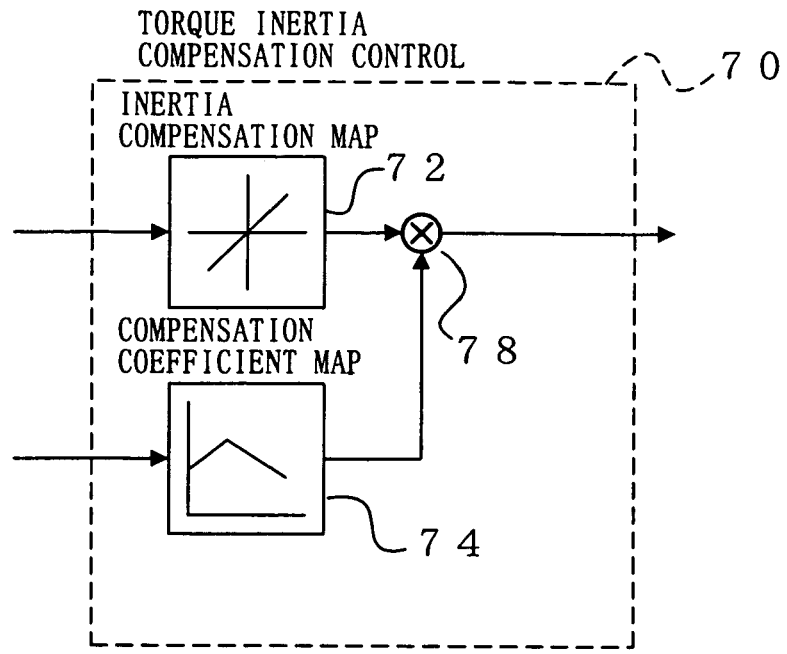
(B)
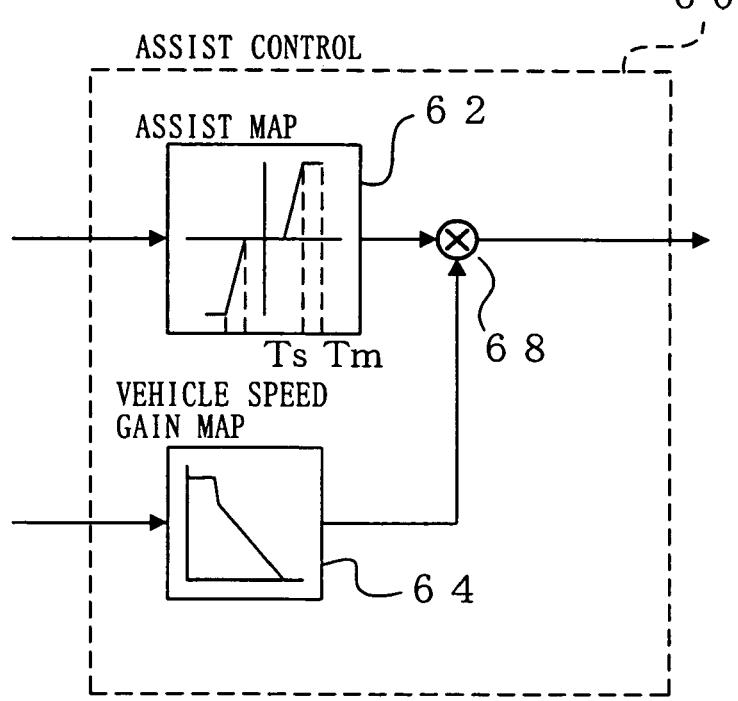

Fig.8
(A)
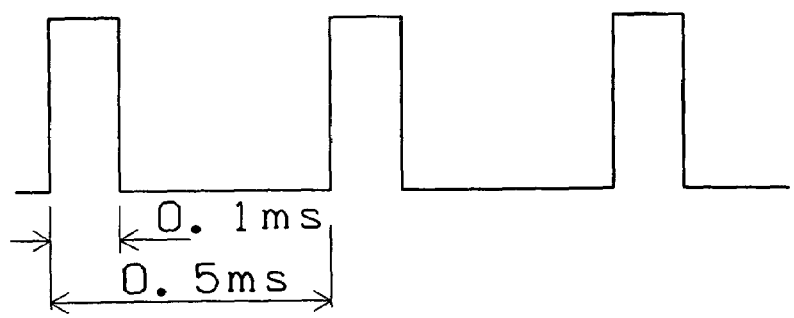
(B)
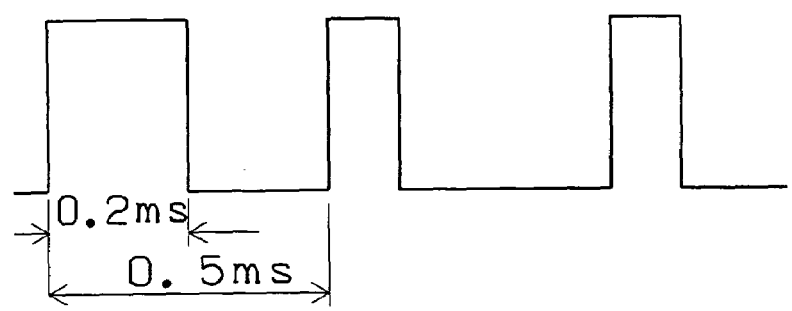
(C)
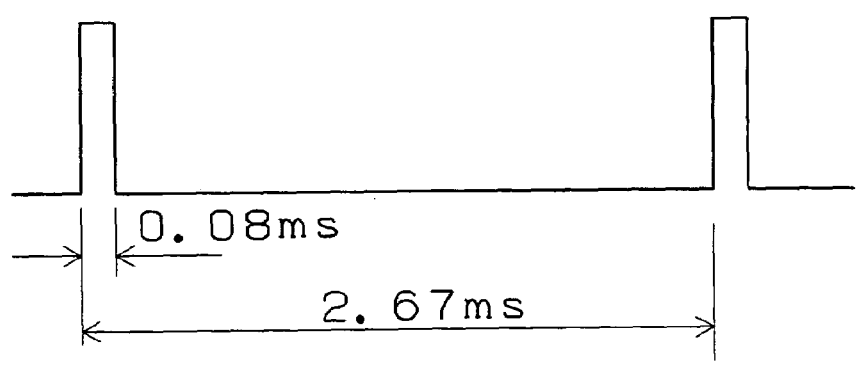
(D)
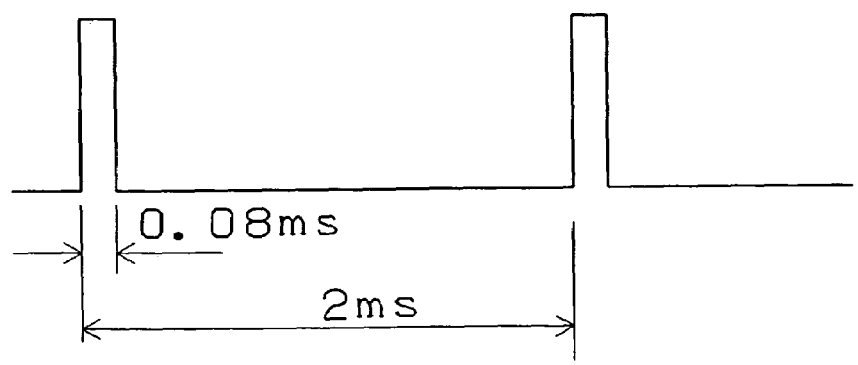

Fig. 11
(A)
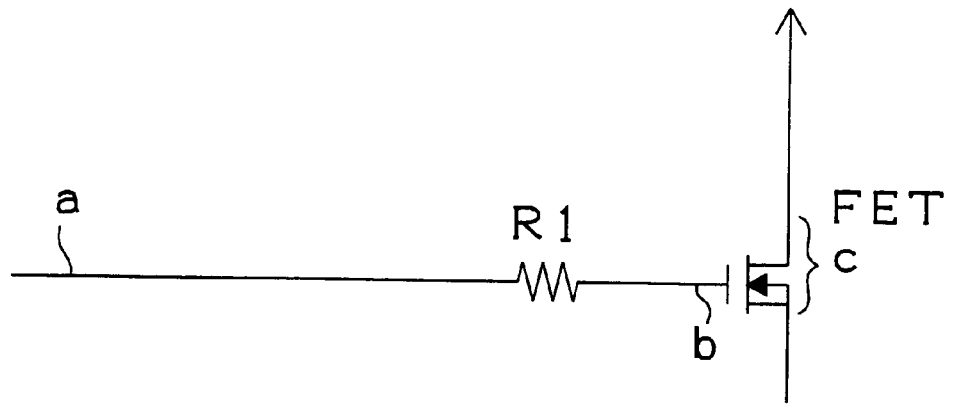
(B)
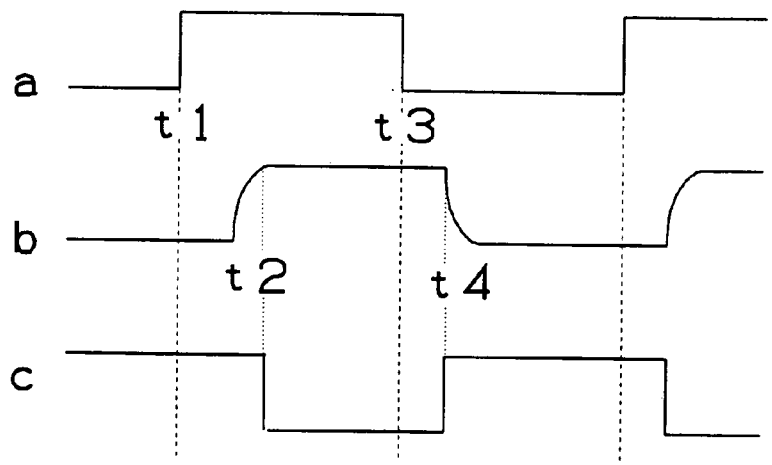
(C)
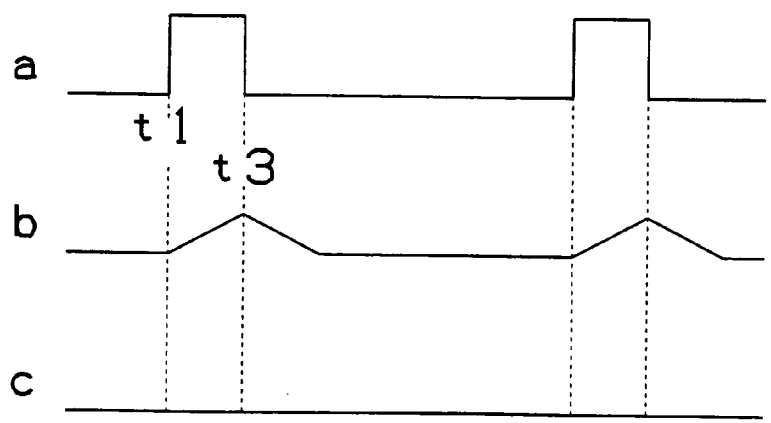

Fig.12
(A)
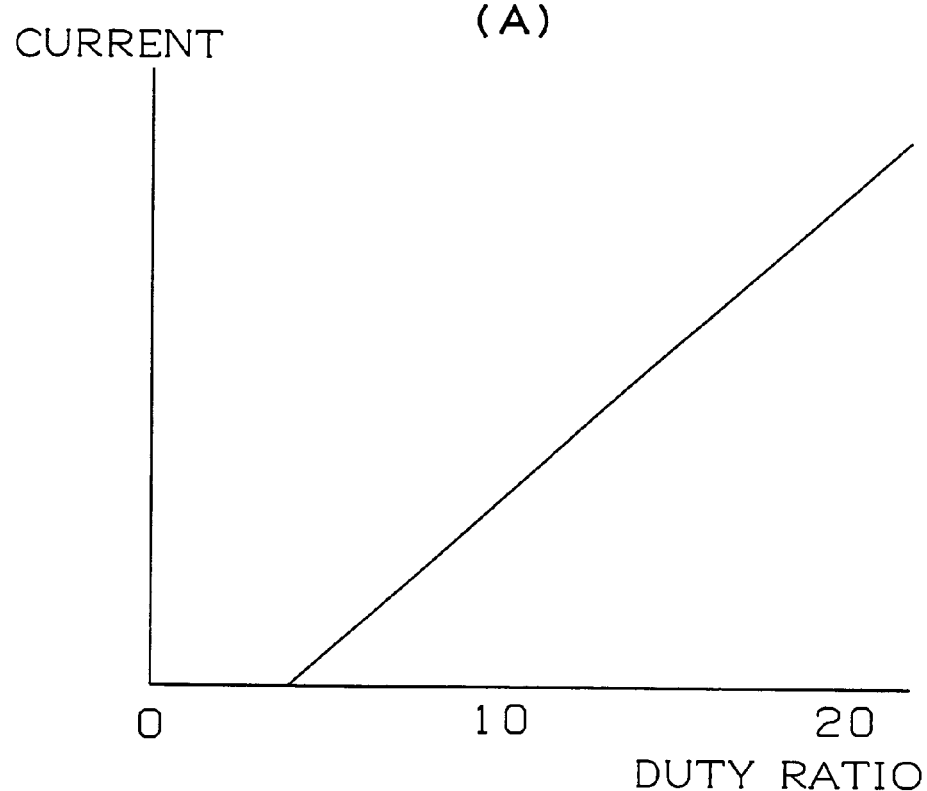
(B)
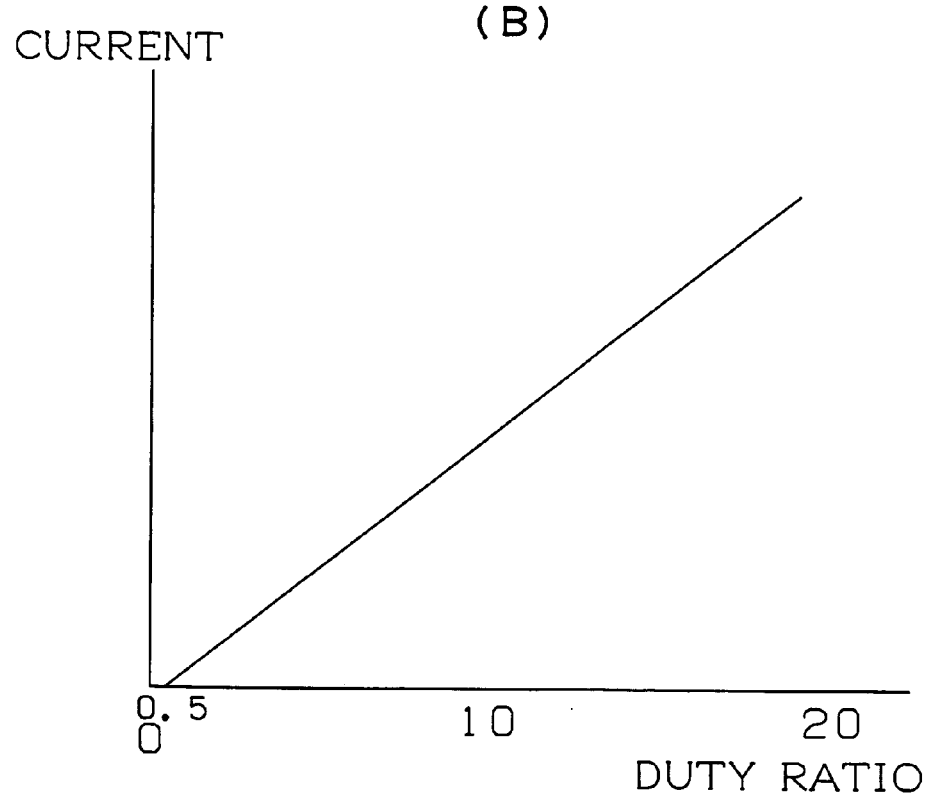

ELECTRIC POWER STEERING APPARATUS

CROSS-REFERENCE TO RELATED APPLICATION

The present application claims priority under 35 U.S.C. §119 to Japanese Patent Application No. JP2004-120407. The content of the application is incorporated herein by reference.

BACKGROUND OF THE INVENTION

1. Field of the Invention

The present invention relates to an electric power steering apparatus assisting a steering by a motor, and more particularly to an electric power steering apparatus in which a motor is PWM controlled.

2. Description of the Related Art

As an electric power steering apparatus, there has been generally known a structure in which a torque sensor detecting a steering torque is attached to an input shaft to which a steering wheel is fixed, and a steering force is reduced by generating an assist torque in correspondence to the steering torque detected by the torque sensor by an electric motor. In the electric power steering apparatus mentioned above, an applied voltage of the electric motor is generally adjusted by changing a duty ratio with a pulse width modulation (PWM).

FIG. 11A shows an FET circuit adjusting the applied voltage to the motor by a switching. A resistance R1 for slow switching the FET is connected to a gate side of the FET, a noise generation due to a rectangular wave shaped pulse generation is prevented by slow switching.

In FIG. 11B, reference symbol a denotes a control signal of the FET circuit, reference symbol b denotes an applied voltage to the gate of the FET, and reference symbol c denotes an on-off of the FET. After the control signal a of the FET is changed to a high level (a timing t1), the applied voltage b to the gate of the FET reaches a high level with a time lag by a time constant circuit (a timing t2), and the FET is turned on in accordance with this. In the same manner, after the control signal a of the FET circuit is changed to a low level (a timing t3), the applied voltage b to the gate of the FET reaches a low level with a time lag by the time constant circuit (a timing t4), and the FET is turned off in accordance with this.

In this case, the prior art discloses a technique of applying a voltage dither signal to the motor at a time of a low duty ratio in order to eliminate a dead zone in the low duty ratio.

[Prior Art] JP 2003-11834 A is incorporated herein by reference.

However, in the slow switching FET circuit shown in FIG. 11A, there is generated a problem that the FET can not be turned on at a time of the low duty ratio. In other words, at a time of the low duty ratio as shown in FIG. 11C, before the control signal a of the FET circuit is changed to the high level (the timing t1), and the applied voltage b to the gate of the FET reaches the high level with the time lag by the time constant circuit, the control signal a of the FET circuit is changed to the low level (the timing t3) and the FET can not be turned on. FIG. 12A is a graph showing a relation between a duty ratio and a current of a prior art. A state in which the current does not flow, that is, the dead zone is generated near a portion in which the duty ratio is zero. In accordance with a method of eliminating the dead zone mentioned above, it is possible to raise the duty ratio at a time of the low duty ratio, however, in this method, since an operation varies on the basis of a variation of the FET, it is possible to completely eliminate the dead zone only in the case that a simple substance modulation per each of elements (a map preparation per each of elements) doing away the variation of the FET is executed.

In the prior art, the dead zone in the low duty ratio is adjusted by applying the voltage dither signal to the motor at a time of the low duty ratio. However, in accordance with the structure mentioned above, it is impossible to apply to the FET circuit executing the slow switching as shown in FIG. 11A, and it is impossible to prevent the noise from being generated.

SUMMARY OF THE INVENTION

The present invention is made for the purpose of achieving the object mentioned above, and an object of the present invention is to provide an electric power steering apparatus in which a dead zone is not generated even at a low duty ratio while slow starting a switching element.

In order to achieve the above object, an electric power steering apparatus according to the present invention comprising:

an arithmetic operating portion detecting a steering state and arithmetically operating a steering assist command value in correspondence to the steering state;

motor generating a steering assist force;

a current application control circuit slow starting a switching element and controlling a current application to the motor; and a motor control portion PWM controlling the motor via the current application control circuit on the basis of the operated steering assist command value, wherein the electric power steering apparatus is provided with a switching cycle modulating means for setting a switching cycle to a predetermined value (a fixed value) at a time when a duty ratio of the PWM control becomes more than a preset value, and making the switching cycle longer than the predetermined value at a time when the duty ratio becomes equal to or less than the preset value.

The electric power steering apparatus is provided with a switching cycle modulating means for setting a switching cycle to a predetermined value (a fixed value) at a time when a duty ratio of the PWM control becomes more than a preset value, and making the switching cycle longer than the predetermined value at a time when the duty ratio becomes equal to or less than the preset value. Accordingly, it is possible to securely apply a current to the motor so as to prevent the dead zone from being generated, by making a switching cycle longer even at the low duty ratio while slow starting the switching element so as to prevent the noise from being generated. Accordingly, it is possible to improve a response delay at a time of steering and it is possible to improve a steering feeling.

In accordance with the more preferred teaching of the present invention, a preset value for determining whether or not the switching cycle is made longer is a duty ratio which can not turn on the switching element at a fixed switching cycle. Accordingly, it is possible to securely apply the current to the motor so as to prevent the dead zone from being generated, by making the switching cycle longer at the duty ratio which can not turn on the switching element at the fixed switching cycle.

In accordance with the more preferred teaching of the present invention, the elongated switching cycle (Tn) is expressed by the following expression in the case that a slow start time of the switching element is set to Td, a margin time for eliminating a variation of the switching is set to Pm, and a duty ratio (%) is set to Dn:

$$Tn=(Td+Pm)\times 100/Dn$$

Since the switching cycle is determined by taking into consideration a margin time Pm for eliminating the variation of the switching, in addition to a slow start time Td, it is possible to securely slow start the switching element even if the switching element and the element connected to the switching element have variations.

In accordance with the more preferred teaching of the present invention, the electric power steering apparatus is provided with a transmission ratio variable means for varying a transmission ratio by driving the electric motor in the middle of a steering transmission system coupling the steering wheel to the steered wheel. Accordingly, even if a control is executed in an open loop by a gear ratio variable system without executing a current feedback, it is possible to eliminate the response delay at a time of steering.

BRIEF DESCRIPTION OF THE DRAWINGS

FIG. 4A is a block diagram of a torque inertia compensation control in FIG. 2;

FIG. 4B is a block diagram of an assist control;

FIGS. 8A and 8B are timing charts showing a switching at a fixed cycle;

FIGS. 8C and 8D are timing charts showing a switching at a time when the cycle is elongated;

FIG. 11A is a view showing an FET circuit modulating an applied voltage to a motor on the basis of a switching in accordance with a prior art;

FIGS. 11B and 11C are timing charts showing a control signal of the FET circuit, the applied voltage to a gate of the FET and an on-off operation of the FET in FIG. 11A;

FIG. 12A is a graph showing a relation between a duty ratio and a motor current in accordance with the prior art; and FIG. 12B is a graph showing a relation between a duty ratio and a motor current in accordance with the first embodiment.

DESCRIPTION OF THE PREFERRED EMBODIMENTS

A description will be given below of an electric power steering apparatus in accordance with an embodiment of the present invention with reference to the accompanying drawings.

FIRST EMBODIMENT

Figure 1:
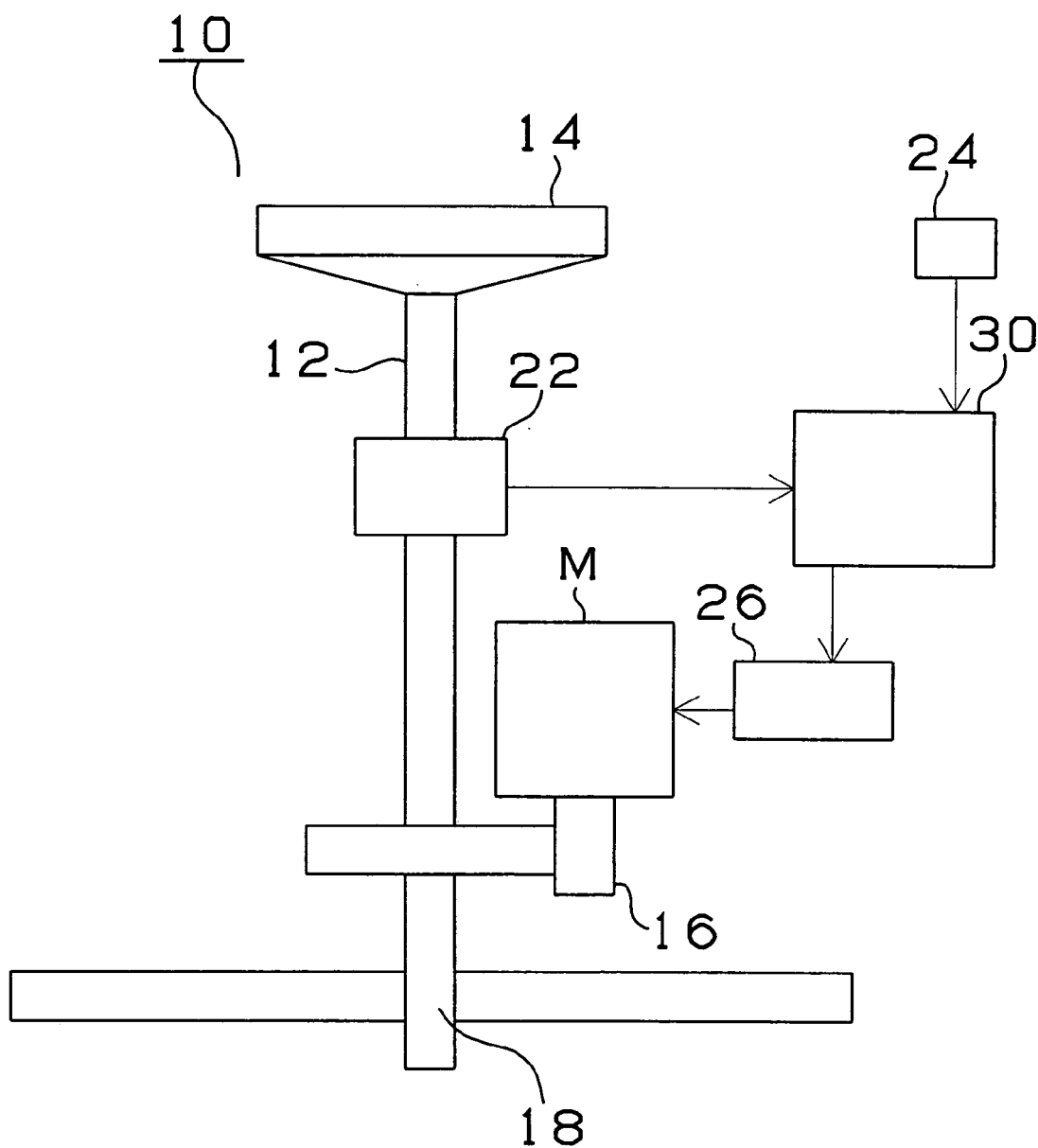
FIG. 1 is a block diagram showing a structure of an electric power steering apparatus in accordance with a first embodiment of the present invention.

FIG. 1 is a block diagram showing a structure of an electric power steering apparatus 10 in accordance with a first embodiment. The electric power steering apparatus 10 is provided with a torque sensor 22 for detecting a steering torque, a control apparatus 30 arithmetically operating a motor command torque (a steering assist amount) on the basis of the steering torque from the torque sensor 22 and a vehicle speed from a vehicle speed sensor 24, and a motor drive circuit 26 determining a current command value in correspondence to the motor command torque so as to control a current application to a motor M.

The torque sensor 22 is arranged in an input shaft 12 coupled to a vehicle steering wheel 14. An output of the motor M is reduced in speed by a reduction gear 16, and is transmitted to a rack and pinion gear 18 for steering a front wheel.

Figure 2:
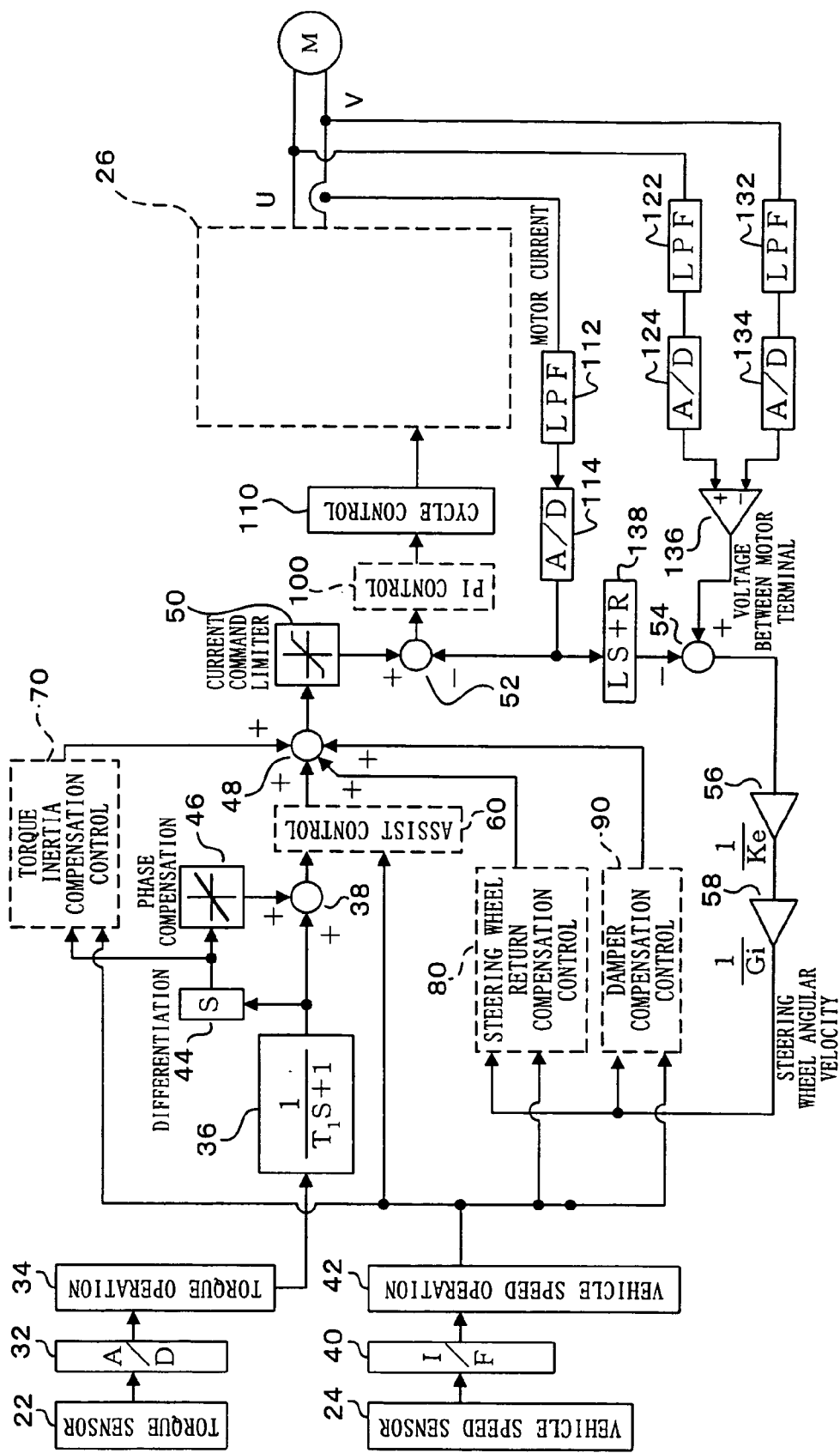
FIG. 2 is a block diagram showing a control system of the electric power steering apparatus in accordance with the first embodiment of the present invention.

A control system of the control apparatus 30 and the motor drive circuit 26 will be shown in a block diagram in FIG. 2. An output (a steering torque: voltage value) from the torque sensor 22 is converted into a digital value via an A/D conversion 32, and a torque value is arithmetically operated in accordance with a torque operation 34. The arithmetically operated torque value is removed noise by a low-pass filter 36, and is input to an assist control 60 via an adding node 38. On the other hand, the vehicle speed (a pulse signal) from the vehicle speed sensor 24 is input to a vehicle speed operation 42 via an I/F 40, and the arithmetically operated vehicle speed is input to the assist control 60. On the other hand, an output from the low-pass filter 36 is phase compensated in accordance with a phase compensation 46 via a differentiation 44, and is input to the assist control 60 via the adding node 38. The phase compensation 46 advances the phase by differentiating the steering torque value with the differentiation 44, and compensates the delay in the steering assist. In other words, when arithmetically operating the command value on the basis of the detected value, a fixed time is required until the arithmetic operation is finished, and the fixed time generates a delay of the command value with respect to the detected value. Accordingly, when determining the command value on the basis of the present detected value, it is impossible to properly control the steering assist. Therefore, the phase compensation 46 advances the phase of the steering torque.

Contents of the assist control 60 will be shown in FIG. 4B. The command torque value is determined in accordance with an assist map 62 in correspondence to the steering torque from the adding node 38. In other words, when the steering torque is large, a high command torque value is determined, and when the steering torque is small, a low command torque value is determined and is output to a multiplication node 68. Further, in the electric power steering apparatus in accordance with the first embodiment, there is provided with a "dead zone" in which a motor control in correspondence to the steering torque is not executed at a time when the steering torque is smaller than a predetermined value. In other words, a rigidity feeling near a neutral steering at a time of traveling at middle and high speeds is increased, and a steering feeling is increased by setting the dead zone. In other words, when an absolute value of the steering torque is smaller than a value Ts, the command torque is output as 0. Further, when it is larger than a predetermined steering torque Tm, a fixed command torque value (a maximum output of the motor) is output as a maximum value.

The vehicle speed value from the vehicle speed sensor 24 is weighed in correspondence to the vehicle speed in accordance with a vehicle speed gain map 64. A value "1" is output, for example, at a time when the vehicle speed is 0 km/h, and a value "0.2" is output at a time when the vehicle speed is 100 km/h, by searching the vehicle speed gain map in correspondence to the vehicle speed. Accordingly, when operating the steering by weighing the steering assist amount in correspondence to the vehicle speed, the steering operation is made light at a time of the low speed, and the steering operation is made heavy at a time of the high speed. A vehicle speed weighing value from the vehicle speed gain map 64 is output to the multiplication node 68 side, and the command torque mentioned above is compensated in correspondence to the vehicle speed.

As shown in FIG. 2, the command torque value from the assist control 60 is added to a current command limiter 50 via the adding node 48. In the current command limiter 50, the command torque value exceeding the maximum output of the motor M is limited.

Figure 6:
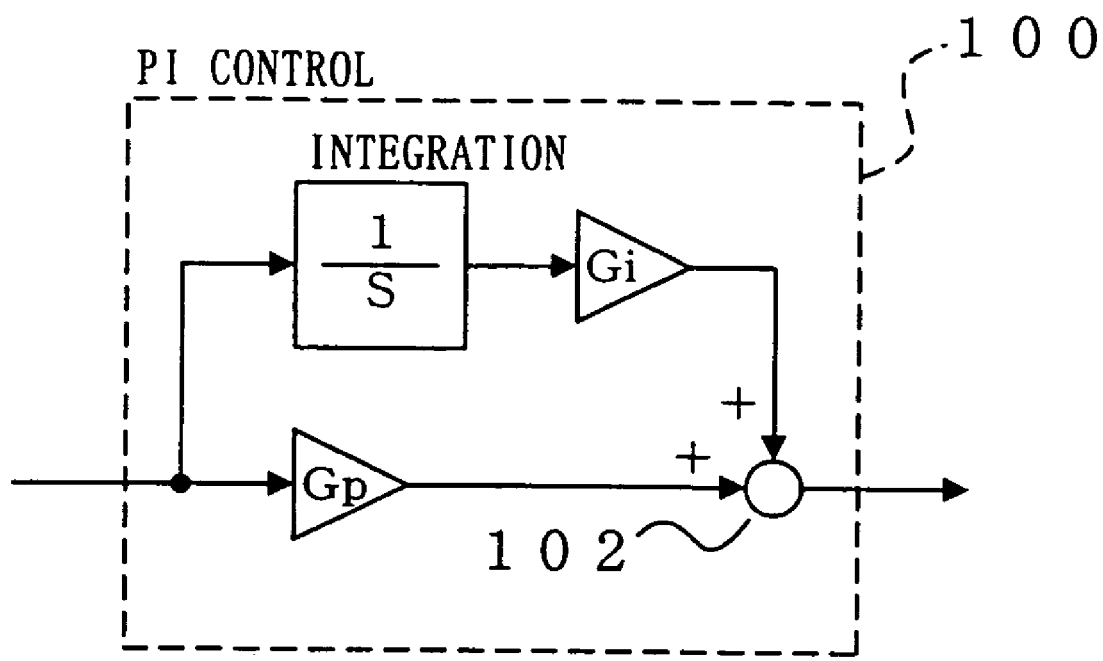
FIG. 6 is a block diagram of a PI control in FIG. 2.

The command torque value from the current command limiter 50 is applied to a PI control 100 via a subtraction node 52. Contents of the PI control 100 will be shown in FIG. 6. In the PI control 100, a Gp gain is multiplied by the command torque value, is applied to an adding node 102, the command torque value is differentiated, and a Gi gain is multiplied and is applied to the adding node 102. On the other hand, the current of the motor M is applied to the subtraction node 52 via a low-pass filter 112 and an A/D conversion 114. In the PI control 100, a PI feedback control is executed in such a manner that an actual motor current input via the A/D conversion 114 becomes a command torque value (a command current value).

Figure 3:
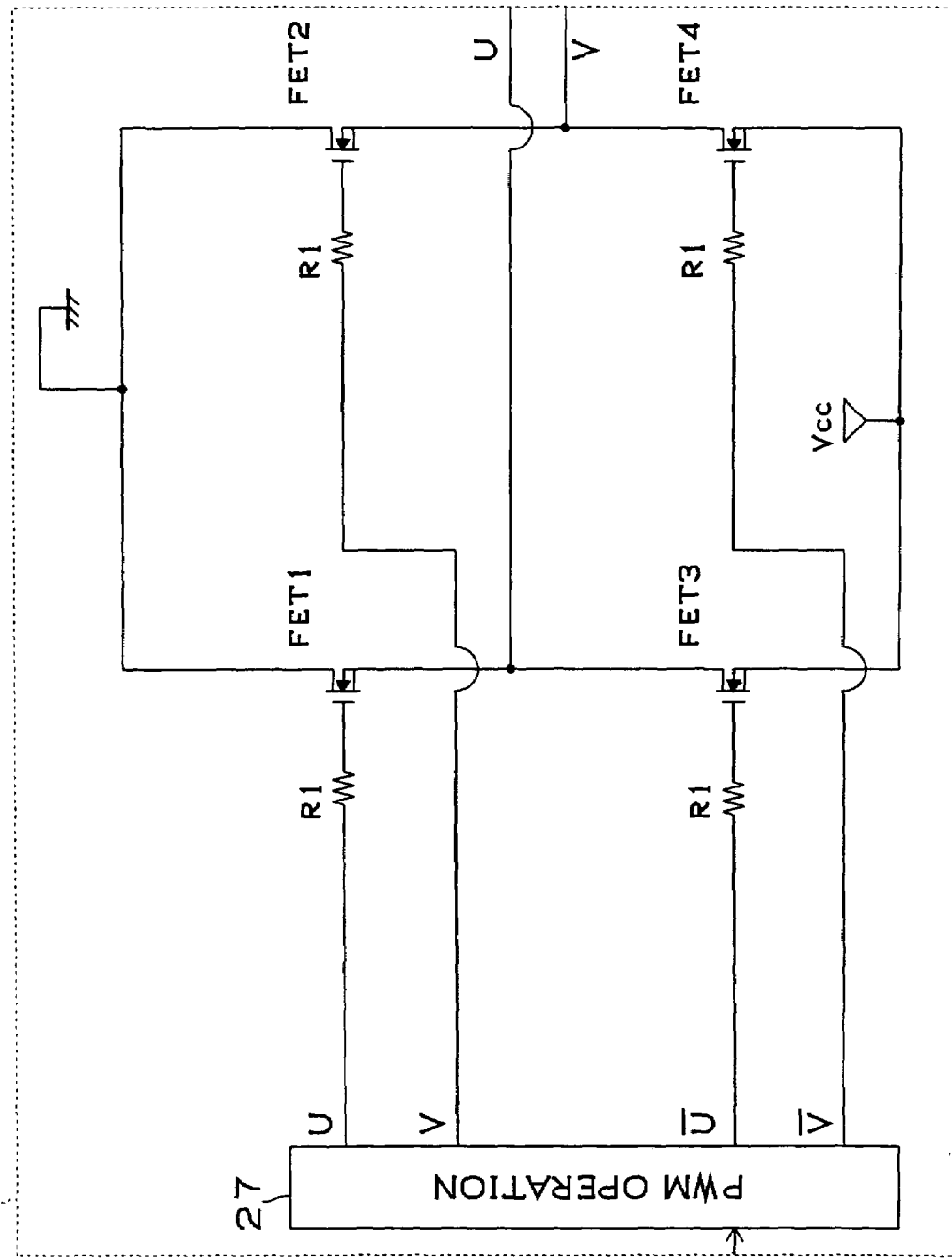
FIG. 3 is a circuit diagram of a motor drive circuit in FIG. 2.

The command torque value from the PI control 100 is applied to the motor drive circuit 26 via a cycle control 110. FIG. 3 shows a circuit structure of the motor drive circuit 26. The motor drive circuit 26 is provided with four bridges FET1, FET2, FET3 and FET4, and a PWM operation 27 applying a voltage to gates of the bridges FET1, FET2, FET3 and FET4 and executing a PWM control for generating an output in correspondence to the command torque value in the motor M at a switching cycle prescribed by the cycle control 110. A resistance R1 for executing the slow switching is connected to the gate side of each of the bridges FET1, FET2, FET3 and FET4, in the same manner as the prior art mentioned above with reference to FIG. 11A, and a noise generation is prevented by executing the slow switching.

An electric potential of a U-phase of the motor is applied to a non-inverted input of a differential amplifier 136 via a low-pass filter 122 and an A/D conversion 124. An electric potential of a V-phase of the motor is applied to an inverted input of the differential amplifier 136 via a low-pass filter 132 and an A/D conversion 134. A voltage between motor terminals is output from the differential amplifier 136, and is applied to the subtraction node 54. A motor current input via the A/D conversion 114 is multiplied in accordance with (LS+R) 138 so as to be applied as a motor electromotive force to the subtraction node 54, and a back electromotive force of the motor is output from the subtraction node 54. In this case, the LS in the multiplied (LS+R) means a differential value of a motor inductance, and the R means a resistance component of the motor.

The back electromotive force from the subtraction node 54 is divided by a back electromotive force constant Ke in the amplifier 56, whereby an angular velocity of the motor is determined. Further, the back electromotive force is divided by a speed reduction ratio Gi of the speed reduction gear 16 in the amplifier 58, and is applied as an angular velocity ω of the steering wheel to a steering wheel return compensation control 80 and a damper compensation control 90. In this case, the angular velocity ω of the steering wheel is estimated with the arithmetic operation, however, the angular velocity can be detected by a steering angle sensor.

Figure 5:
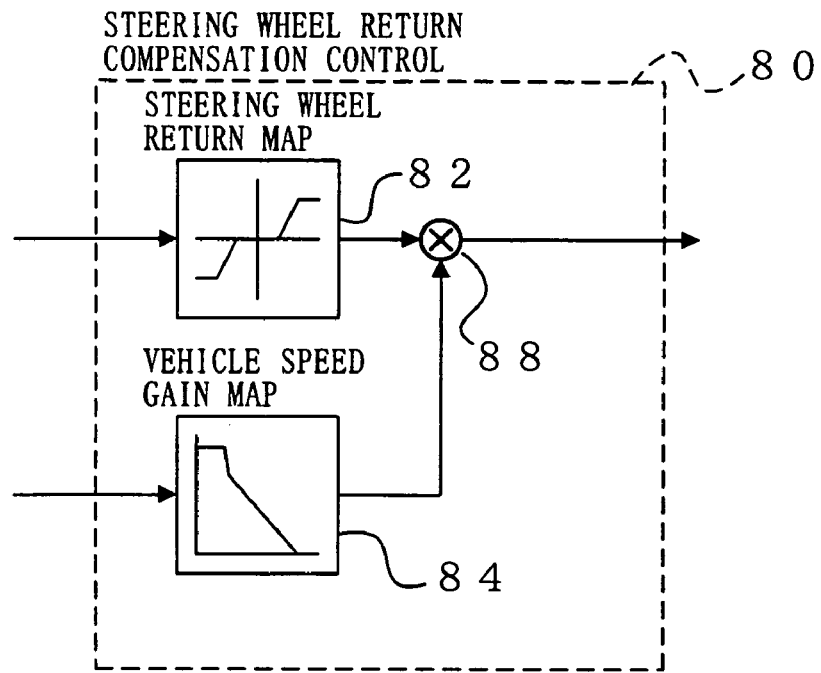
FIG. 5A is a block diagram of a handle return compensation control in FIG. 2.
FIG. 5B is a block diagram of a damper compensation control.

The steering wheel return compensation control 80 executes a control for compensating a characteristic of the electric power steering apparatus in which the steering wheel return caused by a reaction force of a road surface is delayed by a friction resistance of the motor M and the speed reduction gear 16 at a time of the low speed. Contents of the steering wheel return compensation control 80 will be shown in FIG. 5A. An amount of steering wheel return is determined in accordance with a steering wheel return map 82 in correspondence to the angular velocity of the steering wheel. In other words, when the angular velocity of the steering wheel is large, the large steering wheel return amount is determined, and when the angular velocity is small, the small steering wheel return amount is determined, and they are output to the multiplication node 88 side. In the steering wheel return map 82 of the electric power steering apparatus in accordance with the first embodiment, there is provided with a "dead zone" in which the motor control in correspondence to the angular velocity is not executed in the case that the angular velocity is smaller than a predetermined value, in the same manner as the assist map 62 mentioned above. Further, when the angular velocity is larger than the predetermined angular velocity, a fixed steering wheel return amount is output as the maximum value.

The vehicle speed value from the vehicle speed sensor 24 is weighed in correspondence to the vehicle speed by a vehicle speed gain map 84. A value "1" is output, for example, at a time when the vehicle speed is 0 km/h, and a value "0.2" is output at a time when the vehicle speed is 40 km/h, by searching the vehicle speed gain map in correspondence to the vehicle speed. Accordingly, the steering wheel return amount is made large at the low speed, and the return amount is made small at the middle and high speeds. A vehicle speed weighing value from the vehicle speed gain map 84 is output to the multiplication node 88 side, and the steering wheel return amount mentioned above is compensated in correspondence to the vehicle speed. The output of the steering wheel return compensation control 80 is applied to the adding node 48.

In this case, the steering wheel compensation control 80 may determine the steering wheel return amount in correspondence to the angular velocity of the motor M, in place of the angular velocity of the steering wheel.

On the other hand, a damper compensation control 90 shown in FIG. 2 compensates that the steering wheel is quickly returned by the reaction force of the road surface at the middle and high-speeds. This is because the steering wheel is prevented from being returned too much due to the inertia of the motor M and the speed reduction gear 16, once the steering wheel starts returning. Contents of the damper compensation control 90 will be shown in FIG. 5B. A damper amount is determined in accordance with a damper map 92 in correspondence to the angular velocity of the steering wheel. In other words, when the angular velocity of the steering wheel is large, a large damper amount (a small steering wheel return amount) in an inverse direction to the rotating direction of the steering wheel is determined, and when the angular velocity is small, a small damper amount (a large steering wheel return amount) is determined, and they are output to the multiplication node 98 side. The damper map 92 is provided with a "dead zone" in which the motor control in correspondence to the angular velocity is not executed in the case that the angular velocity is smaller than the predetermined value, in the same manner as the assist map 62 mentioned above. Further, when the angular velocity is larger than the predetermined angular velocity, a fixed damper amount is output as the maximum value.

The vehicle speed value from the vehicle speed sensor 24 is weighed in correspondence to the vehicle speed in accordance with a vehicle speed gain map 94. A value "0" is output, for example, at a time when the vehicle speed is 0 kin/h, and a value "0.6" is output at a time when the vehicle speed is 40 km/h, by searching the vehicle speed gain map in correspondence to the vehicle speed. Accordingly, the damper amount is made large at the high speed, and the damper amount is made small at the low speed. A vehicle speed weighing value from the vehicle speed gain map 94 is output to a multiplication node 98 side, and the damper amount mentioned above is compensated in correspondence to the vehicle speed. The damper amount compensated by the vehicle speed is applied to the adding node 48 shown in FIG. 2, and compensates the command torque value from the assist control 60.

In this case, the damper compensation control 90 may determine the damper amount in correspondence to the angular velocity of the motor M, in place of the angular velocity of the steering wheel.

As shown in FIG. 2, the differential value of the steering torque and the vehicle speed value are input to a torque inertia compensation control 70. The torque inertia compensation control 70 reduces an inertia feeling that the steering operation is heavy at a time of starting steering, and the steering wheel keeps on being steered once starting steering. Contents of the torque inertia compensation control 70 will be shown in FIG. 4A. An inertia compensation amount is determined in accordance with an inertia compensation map 72 in correspondence to the steering torque differentiated in the differentiation 44. In other words, when the steering torque differential value is large, a high inertia compensation amount is determined, and when the steering torque is small, a low inertia compensation value is determined, and they are output to the multiplication node 78 side.

The vehicle speed value from the vehicle speed sensor 24 is weighed in correspondence to the vehicle speed in accordance with a compensation coefficient map 74. A value "0.7" is output, for example, at a time when the vehicle speed is 0 km/h, a value "1.0" is output at a time when the vehicle speed is 40 km/h, and a value "0.6" is output at a time when the vehicle speed is 70 km/h. Accordingly, the inertia compensation amount is made small at the low speed, large at the middle speed, and small at the high speed. A weighing value from the compensation coefficient map 74 is output to the multiplication node 78 side, and the inertia compensation amount mentioned above is compensated in correspondence to the vehicle speed. The inertia compensation amount compensated by the vehicle speed is applied to the adding node 48 shown in FIG. 2, and compensates the command torque value from the assist control 60.

Figure 7:
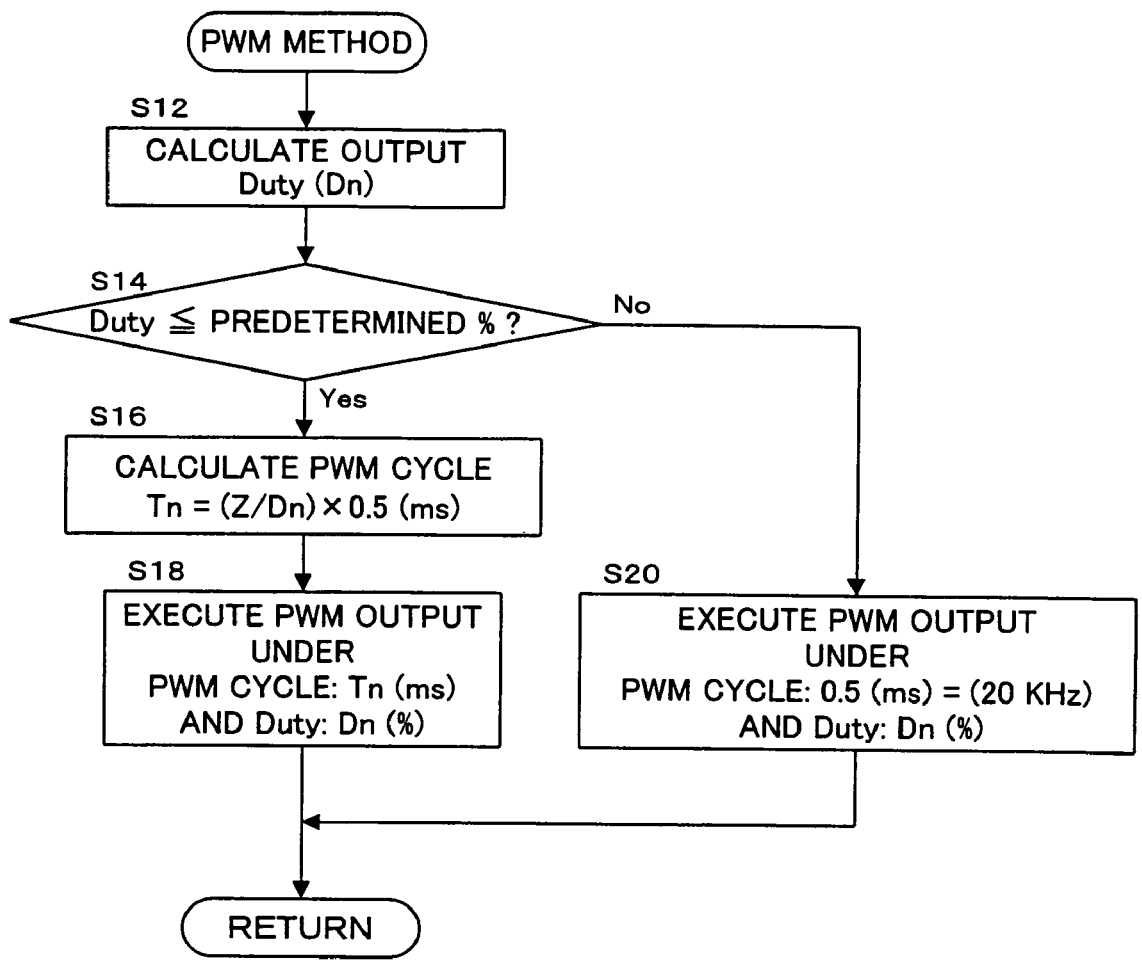
FIG. 7 is a flow chart showing a process in a cycle control in FIG. 2.

In this case, a description will be given of a change of a switching cycle of the PWM control in accordance with a cycle control 110 with reference to FIGS. 7 and 8.

FIGS. 8A and 8B are timing charts showing a switching in a fixed cycle at a time of a high duty ratio, and FIGS. 8C and 8D are timing charts showing a switching at a time when the cycle in the low duty ratio is elongated.

In the first embodiment, when the duty ratio is more than 16%, a switching frequency of the FET (a switching frequency of a PWM control) is fixed to 20 KHz (the switching cycle 0.5 ms), and an on time of the FET is modulated in correspondence to the duty ratio. FIG. 8A shows the switching at a time when the duty ratio is 20%. In this case, the FET is turned on for 0.1 ms in the cycle of 0.5 ms (is actually turned on and turned off with a delay of a delay circuit). Further, FIG. 8B shows the switching at a time when the duty ratio is 40%. In this case, the FET is turned on for 0.2 ms in the cycle of 0.5 ms.

On the other hand, when the duty ratio is a low duty ratio equal to or less than 16%, the switching frequency of the FET (the switching frequency of the PWM control) is made variable, and the on time is fixed so as to modulate the switching cycle in correspondence to the duty ratio. FIG. 8C shows the switching at a time when the duty ratio is 3%. In this case, the FET is turned on for 0.08 ms in the cycle of 2.67 ms. Further, FIG. 8D shows the switching at a time when the duty ratio is 4%. In this case, the FET is turned on for 0.08 ms in the cycle of 2 ms.

A delay time in accordance with a time constant constituted by the resistance R1 connected to the gate side of the FET mentioned above with reference to FIG. 3, that is, a delay time (a switch delay time Td) required for preventing the noise is about 0.03 ms. On the other hand, taking into consideration a variation of the elements such as the resistance R1, the FET and the like, a temperature change of an element characteristic and the like, a margin time for securely turning on the FET is about 0.05 ms. Accordingly, in the first embodiment, the on time of the FET, that is, the on time of a U phase, a V phase, an inverter U phase and an inverter V phase from the PWM operation 27 shown in FIG. 3, is set to 0.08 ms (0.03 ms+0.05 ms), and the switching cycle side is made variable as mentioned above with reference to FIGS. 8C and 8D. Accordingly, the bridges FET1, FET2, FET3 and FET4 are securely turned on.

A description will be given of a process of determining the switching cycle of the PWM control in accordance with the cycle control 110 with reference to a flow chart in FIG. 7.

First, an output duty ratio (Dn) is computed (S12). In this case, a numeric value after the decimal point is rounded off so as to be calculated by % unit, and 0.4% and 0.5% are respectively calculated as 0% and 1%. Next, the step determines whether or not the duty ratio is equal to or less than a predetermined value (for example, 16%) (S14). In this case, when the duty ratio is more than the predetermined value (NO in S14), the PWM cycle is fixed to 0.5 ms, that is, the PWM frequency is fixed to 20 KHz, the on time in correspondence to the duty ratio is set, for example, when the duty ratio is 20% as mentioned above with reference to FIG. 8A, the on time of 0.1 ms is set, and when the duty ratio is 40% as mentioned above with reference to FIG. 8B, the on time of 0.2 ms is set.

On the other hand, next, in the case that the duty ratio is equal to or less than the predetermined value (16%) (Yes in S14), the switching cycle Tn of the PWM control is first calculated (S16). In this case, on the assumption that the change duty is set to Z, the duty ratio is set to Dn, and the cycle in 20 KHz is set to 0.5 ms, the switching cycle Tn is determined on the basis of the following expression.

$$Tn = (Z/Dn) \times 0.5 \text{ (ms)} \tag{1}$$

In this case, on the assumption that the switch delay time mentioned above is set to Td, and the margin time is set to Pm, the change duty Z is determined on the basis of the following expression.

$$Z = (Td/0.5) \times 100 + Pm \text{ (\%)} \tag{2}$$

In other words, the switching cycle Tn is determined on the basis of the following expression.

$$Tn = (Td + Pm) \times 100/Dn \text{ (ms)} \tag{3}$$

For example, in the case that the switch delay time Td employs 0.03 ms, and the margin time Pm employs 0.05 ms as mentioned above, the switching cycle Tn is 8 ms in the duty ratio of 1%, the switching cycle Tn is 4 ms in the duty ratio of 2%, the switching cycle Tn is 2.67 ms in the duty ratio of 3%, the switching cycle Tn is 2 ms in the duty ratio of 4%, the switching cycle Tn is 1.6 ms in the duty ratio of 5%, and the switching cycle Tn is 1.3 ms in the duty ratio of 6%.

Further, the PWM output is executed (S18) in correspondence to the duty ratio as mentioned above, in the calculated PWM cycle Tn, and the process is finished.

In the first embodiment, since the switching cycle is determined while taking into consideration the margin time Pm for eliminating the variation of the switching in addition to the slow start time Td, it is possible to securely slow start the switching element even if the switching element such as the FET or the like, and the element connected to the switching element have the variation.

In this case, the predetermined value (16% in the example mentioned above) for determining in the step S14 in FIG. 7 whether or not the switching cycle need to be elongated is set to the duty ratio which can not turn on the switching element in the fixed switching cycle. In other words, when the switching cycle (0.5 ms: PWM frequency of 20 KHz) is 16%, the on cycle is obtained by the expression 0.5× 0.16=0.08 (ms), and becomes equal to the time obtained by adding the switch delay time Td (0.03 ms) and the margin time Pm (0.05 ms) mentioned above. When the switching cycle is shorter, it is impossible to securely turn on the FET. Accordingly, it is possible to securely apply the current to the motor and prevent the dead zone from being generated, by elongating the switching cycle in the duty ratio equal to or less than the duty ratio which can not turn on the switching element in the fixed switching cycle.

In this case, the duty ratio is rounded off by % unit as mentioned above. For example, if the current is applied at a time of the duty ratio of 0.1%, the switching cycle Tn becomes 80 ms, and the vibration is generated in the steering wheel if the motor is controlled in accordance with the intermittent cycle. Accordingly, the rounded-off duty ratio can prevent this trouble.

FIG. 12B is a graph showing a relation between the duty ratio and the motor current in accordance with the first embodiment. Until the duty ratio is between 0 and 0.4%, the state in which the current is not applied, that is, the dead zone is generated, however, when the duty ratio is more than 0.5%, it is possible to apply the current to the motor in correspondence to the duty ratio. In other words, the dead zone is equal to or less than 0.4%, and it is possible to practically eliminate the dead zone.

In accordance with the first embodiment, when the duty ratio of the PWM control becomes more than the preset value, the switching cycle is fixed, and when the duty ratio becomes equal to or less than the present value, the switching cycle is elongated. Accordingly, it is possible to securely apply the current to the motor and it is possible to prevent the dead zone from being generated, by elongating the switching cycle even in the low duty ratio while preventing the noise from being generated by slow starting the switching element such as the FET, the transistor or the like. Accordingly, it is possible to improve the response delay at a time of steering, and it is possible to improve the steering feeling.

SECOND EMBODIMENT

In the first embodiment mentioned above, the structure of the present invention is used for modulating the assist torque of the electric power steering apparatus. On the contrary, a second embodiment relates to an electric power steering apparatus provided with a transmission ratio variable means for varying a transmission ratio by driving the electric motor in the middle of a steering transmission system coupling a steering wheel to a steered wheel.

Figure 9:
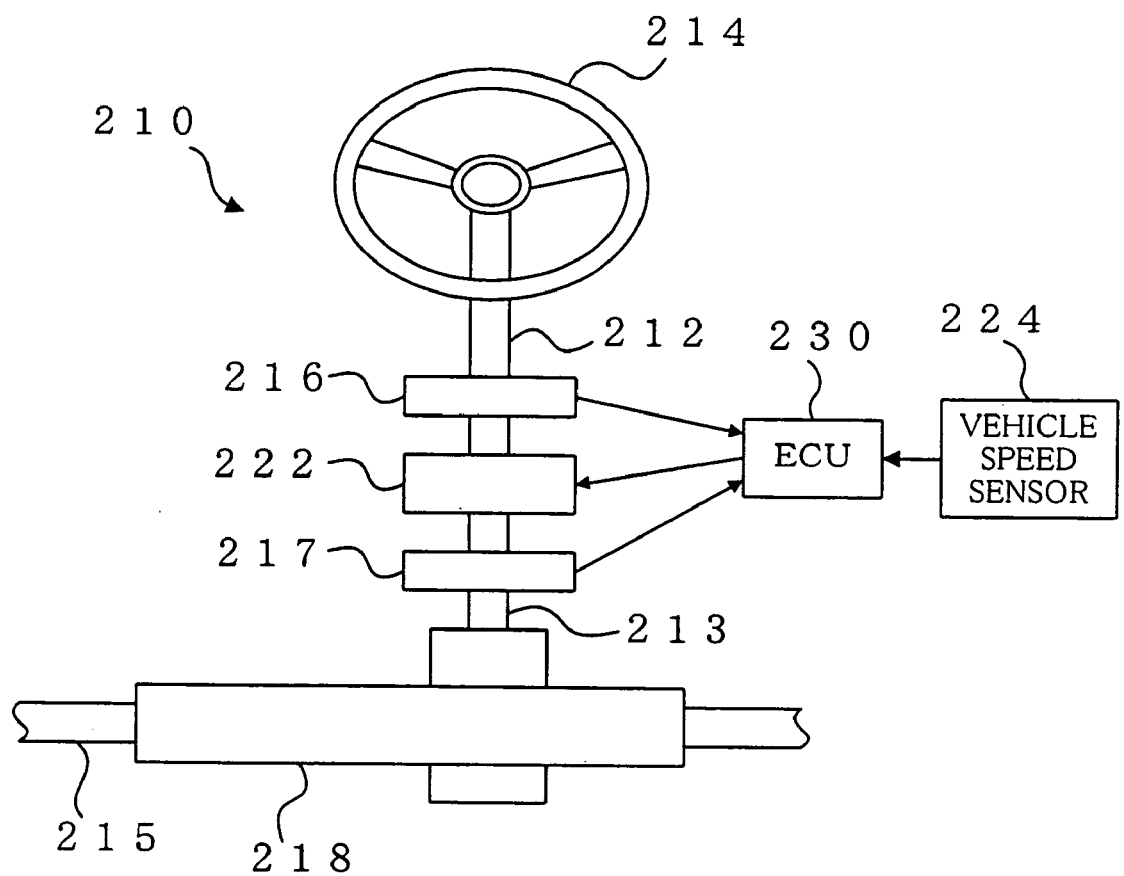
FIG. 9 is a block diagram showing a structure of an electric power steering apparatus in accordance with a second embodiment of the present invention.

As shown in FIG. 9, an electric power steering apparatus 210 is mainly constituted by a steering wheel 214, a first steering shaft 212, a second steering shaft 213, a steering gear box 218, a steering angle sensor 216, a vehicle speed sensor 224, an output angle sensor 217, an ECU 230 and a gear ratio variable unit 222.

In other words, one end of the first steering shaft 212 is connected to the steering wheel 214, and an input side of the gear ratio variable unit 222 is connected to the other end side of the first steering shaft 212. The gear ratio variable unit 222 is constituted by a motor, a speed reduction gear and the like, one end side of the second steering shaft 213 is connected to an output side thereof, and an input side of the steering gear box 218 is connected to the other end side of the second steering shaft 213. Further, the steering gear box 218 is structured such that the steering gear box 218 can convert a rotating motion input by the second steering shaft 213 into an axial motion of the rod 215 by a rack and pinion gear (not shown) or the like so as to output. Further, a rotating angle (a steering angle) of the first steering shaft 212 is detected by the steering angle sensor 216, a rotating angle (an output angle) of the second steering shaft 213 is detected by the output angle sensor 217, and a vehicle speed is detected by the vehicle speed sensor 224, respectively, thereby being input as a steering angle signal, an output angle signal and a vehicle speed signal to the ECU 230.

In accordance with the structure mentioned above, the gear ratio variable unit 222 changes a ratio of an output gear in real time with respect to an input gear in correspondence to the vehicle speed by the motor and the speed reduction gear, and varies a ratio of the output angle of the second steering shaft 213 with respect to the steering angle of the first steering shaft 212. In other words, it is possible to determine the rotating angle of the motor of the gear ratio variable unit 222 which is definitely determined in correspondence to the vehicle speed, in accordance with a motor rotating angle map, by inputting the steering angle signal by the steering angle sensor 216 and the vehicle speed signal by the vehicle speed sensor 224 to the ECU 230, and it is possible to supply the motor voltage in correspondence to the determined rotating angle command value to a motor drive circuit (not shown) via an amplifier circuit (not shown).

Accordingly, the steering gear ratio in correspondence to the vehicle speed can be set, for example, such that the output angle of the gear ratio variable unit 222 becomes larger with respect to the steering angle of the steering wheel at a time when the vehicle stops or travels at a low speed, and the output angle of the gear ratio variable unit 222 becomes smaller with respect to the steering angle of the steering wheel at a time when the vehicle travels at a high speed. In other words, the gear ratio variable unit 222 is structured mainly for the purpose of improving an arrangement of the steering wheel.

The ECU 230 executes the PWM control of the motor of the gear ratio variable unit 222 by varying the switching cycle at a time of the low duty ratio in the same manner as the first embodiment.

In accordance with the second embodiment, it is possible to eliminate the current sensor of the motor, and it is possible to eliminate the response delay at a time of steering even if the control is executed in an open loop without executing the current feedback.

THIRD EMBODIMENT

In the first embodiment mentioned above, the structure of the present invention is used for modulating the assist torque of the electric power steering apparatus. On the contrary, a third embodiment relates to an electric power steering apparatus of a steer-by-wire (SBW) type which detects an operation of a steering wheel and executes a steering by driving an actuator by means of a control apparatus.

Figure 10:
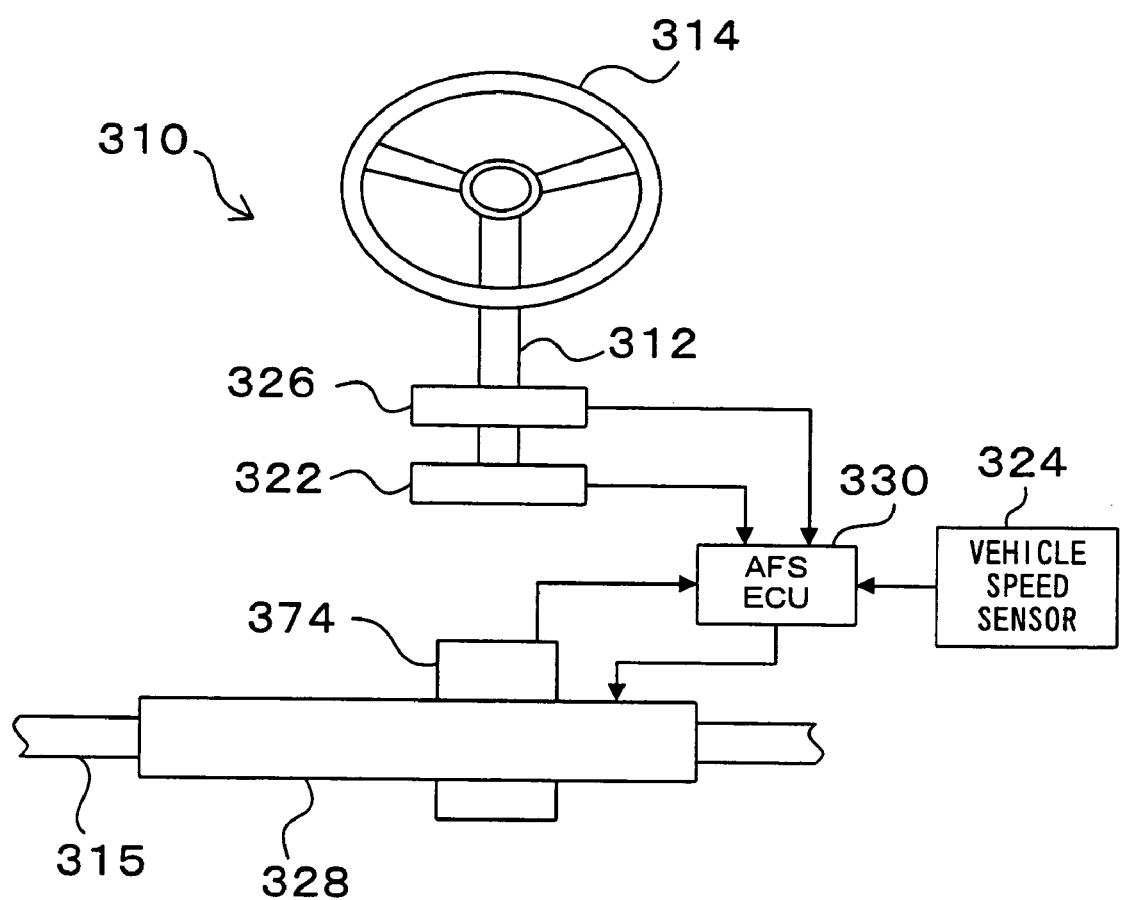
FIG. 10 is a block diagram showing a structure of an electric power steering apparatus in accordance with a third embodiment of the present invention.

As shown in FIG. 10, an electric power steering apparatus 310 is mainly constituted by a steering wheel 314, a steering shaft 312, a steering angle sensor 326, a torque sensor 322, an actual steering angle sensor 374, a steering actuator 328, a shaft 315, a vehicle speed sensor 324 and an ECU 330.

In other words, a steering condition is detected by the steering angle sensor 326 and the torque sensor 322, the ECU 330 determines the steering angle on the basis of detected values, and the steering is executed by the steering actuator 328, and is detected by the actual steering angle sensor 374.

The ECU (the steering angle determining means) 330 in accordance with the third embodiment executes the PWM control of the motor of the steering actuator 328 by varying the switching cycle at a time of the low duty ratio in the same manner as the first embodiment.

Although the invention has been disclosed in the context of a certain preferred embodiments, it will be understood that the present invention extends beyond the specifically disclosed embodiments to other alternative embodiments of the invention. Thus, it is intended that the scope of the invention should not be limited by the disclosed embodiments but should be determined by reference to the claims that follow.

What is claimed is:

1. An electric power steering apparatus comprising:
    an arithmetic operating portion detecting a steering state and arithmetically operating a steering assist command value in correspondence to the steering state;
    a motor generating a steering assist force;
    a current application control circuit slow starting a switching element and controlling a current application to the motor; and
    a motor control portion PWM controlling the motor via the current application control circuit on the basis of the operated steering assist command value,
    wherein the electric power steering apparatus is provided with a switching cycle modulating means for setting a switching cycle to a predetermined value at a time when a duty ratio of the PWM control becomes more than a preset value, and making the switching cycle longer than the predetermined value at a time when the duty ratio becomes equal to or less than the preset value.

2. An electric power steering apparatus according to claim 1, wherein the preset value is a duty ratio which can not turn on the switching element in the fixed switching cycle.

3. An electric power steering apparatus according to claim 1, wherein the elongated switching cycle (Tn) is expressed by the following expression in the case that a slow start time of the switching element is set to Td, a margin time for eliminating a variation of the switching is set to Pm, and a duty ratio (%) is set to Dn:

$$Tn=(Td+Pm)\times 100/Dn$$

4. An electric power steering apparatus according to claim 2, wherein the elongated switching cycle (Tn) is expressed by the following expression in the case that a slow start time of the switching element is set to Td, a margin time for eliminating a variation of the switching is set to Pm, and a duty ratio (%) is set to Dn:

$$Tn=(Td+Pm)\times 100/Dn$$

5. An electric power steering apparatus according to claim 1, wherein the electric power steering apparatus is provided with a transmission ratio variable means for varying a transmission ratio by driving the electric motor in the middle of a steering transmission system coupling the steering wheel to the steered wheel.

6. An electric power steering apparatus according to claim 2, wherein the electric power steering apparatus is provided with a transmission ratio variable means for varying a transmission ratio by driving the electric motor in the middle of a steering transmission system coupling the steering wheel to the steered wheel.

7. An electric power steering apparatus according to claim 3, wherein the electric power steering apparatus is provided with a transmission ratio variable means for varying a transmission ratio by driving the electric motor in the middle of a steering transmission system coupling the steering wheel to the steered wheel.

* * * * *